June 11, 1968 H. W. WHIPPLE 3,387,746
SELECTIVE SEED PLANTER
Filed Nov. 28, 1966 2 Sheets-Sheet 1

INVENTOR.
H. WALTON WHIPPLE
BY
*Victor J. Evans*
ATTORNEYS 3,387,746
SELECTIVE SEED PLANTER
Harry W. Whipple, Harlingen, Tex., assignor of one-third to Robert F. Ashley, La Feria, and one-third to Othal E. Brand, McAllen, Tex.
Filed Nov. 28, 1966, Ser. No. 597,469
1 Claim. (Cl. 221—211)

ABSTRACT OF THE DISCLOSURE

A selective seed planter in which a rotor wheel provides for dispensing of seeds for picking up seeds or grain and removes additional grains picked up by the brush for achieving single delivery of seed and grain so that the process of thinning out plants is eliminated, in which apparatus provides for a vacuum and compression line for enabling seeds to be released and blown into a hopper to achieve single delivery of seed and grain.

---

The present invention relates to the art of selective seed planter apparatus and more particularly the invention is directed to a specific construction which not only provides means for picking up an item of grain, but also removes any additional grains by the brush, and as a result, single delivery of an item of grain is accomplished so that the process of thinning out plants is eliminated, which is usually otherwise performed after the seeds have grown into small plants.

An object, therefore, now of the invention is to provide a vacuum and compression line for the purpose of providing single delivery of seeds to a hopper element and then to break the vacuum and resort to compression in order that the seed may be released and blown into a hopper or the like, and in which there has been removed any additional grains by a brush so as to result in single delivery of an article of grain so that the process of thinning out of plants is thereby eliminated.

The above and other objects and advantages of the invention will become apparent upon full consideration of the following detailed description and accompanying drawings, in which:

FIGURE 3 is a cross-sectional detail view of the diaphragm mounting construction showing a part of the invention.

Figure 1:
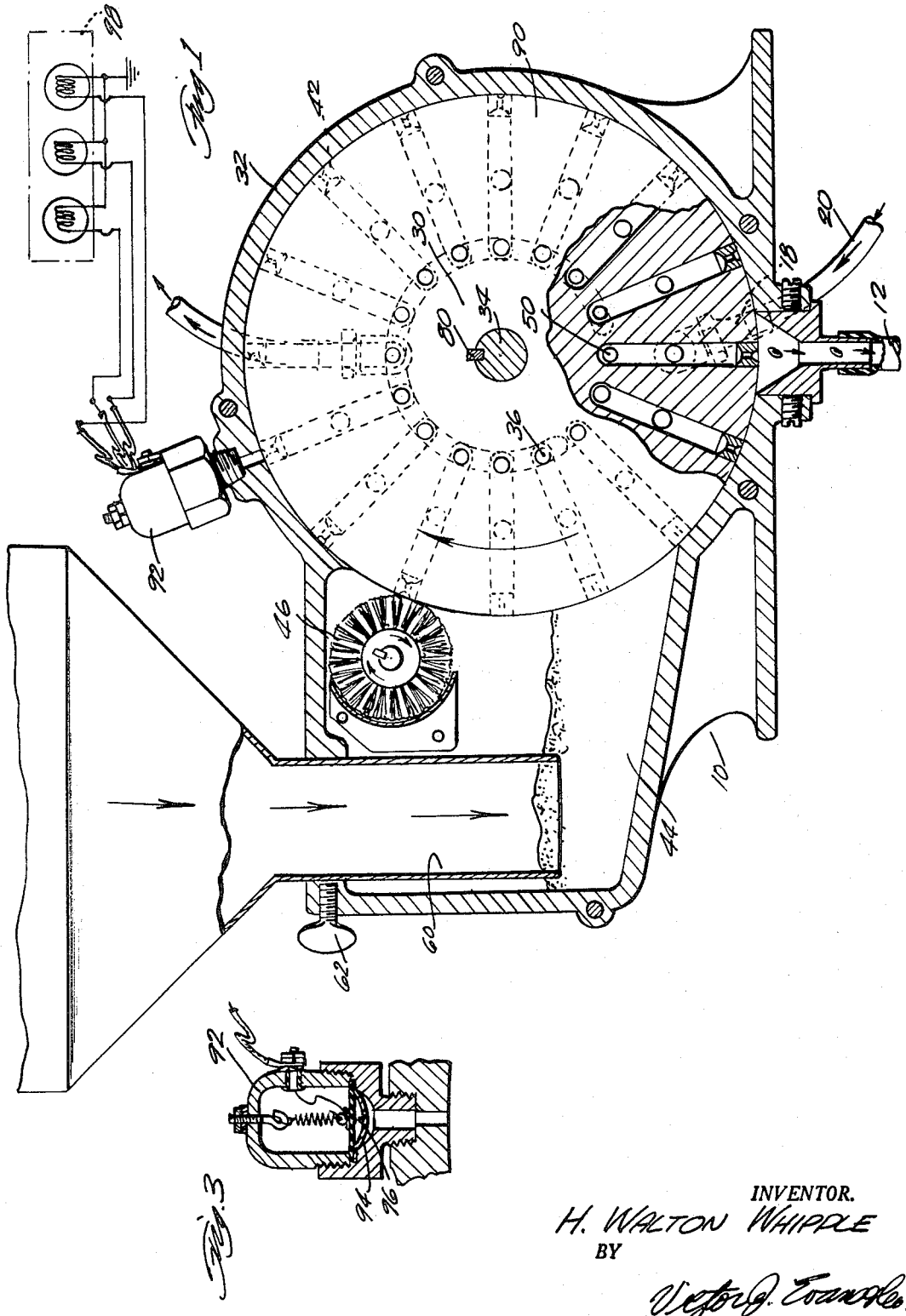
FIGURE 1 is a side cross-sectional view of the selective seed planter embodying the principle and preferred embodiments of the present invention.

Referring now to the drawings there is shown the selective seed planter 10 for use with all vegetable seeds for the purpose of selecting one seed at a time and planting such seed in precision intervals as the planter passes along over the field. The selective seed planter is subject to having an attachment device that embodies the invention and can be installed on all seed planters and will provide and produce substantially perfect control of seeds where precision planting is desired and it is sought to eliminate replanting and transplanting of small seedlings.

The selective seed planter 10 is seen to have channels 12, 14, 16 to plant three rows at a time, and it is within the contemplation of the present invention to plant with only one of the channels 12, 14, 16, if desired. By the use of air pressure or compressed air being supplied to inlet 18, which is connected by an air hose 20 to a source of compressed air (not shown), the seeds dispensed through channels 12, 14, 16 may be handled gently with no harm to the seeds in their transport through the channels and through the tubing 22, 24, 26. There is axially mounted within the selective seed planter 10 a selective rotor wheel 30 which is fitted within the housing 32 with close tolerance and as the wheel rotates about the shaft 34, the port 36 engages the vacuum port 38 which opens into the seed port 40 as the seed selecting tip 42 is passed through the seed chamber 44 (FIGURE 1).

This is seen to pull the seed into the seed tip 42 which is of a size to hold only one seed, and the tips 42 may be interchanged with other sized elements to accommodate whatever size seed that is to be selected and planted by the seed planter 10.

Where in the case in which two or more seeds hang or are collected together and are positioned within the outside tip 42, then the brush 46 of FIGURE 1 will take them off and leave only one seed in the tip 42. The vacuum holds the seed in the holding tip until the rotor 30 arrives at a point in rotation near port 50 where the vacuum chamber ends and the air pressure part of the system supplied through the port 52 opens which flows or drives the seed through the delivery block 54 and into the plastic tubes 22, 24, 26, then to the open furrow between the opening and the cover plows (not shown) which are at the ends or proximate thereof of such tubes 22, 24, 26.

The hopper stem 60 shows the manner in which it can be adjusted up or down with the set screw 62 for obtaining the proper seed level within the seed chamber 44.

A further feature of the disclosure is that there is provided a nylon washer plate 66 that is about the shaft 34 and having a polished face 68 that turns with the rotor wheel 30 and slides against the steel washer plate 70 which also has a polished face 72. This provides an air-tight seal in rotating and in isolating the vacuum system that is disposed above the shaft 34 with the pressure system that is disposed and mounted below the shaft 34 all within the housing 32. This in turn opens and closes the vacuum and air ports in channel 38 and channel 52. The steel plate 70 is held stationary to housing 32 with pins 74, 74, and the nylon plate 66 is held in place with a snap ring 77 which enables the rotor wheel 30 to be removed and replaced without disturbing the plates 66, 70. The keyway 80 holds the rotor wheel 30 as well as the nylon plate 66 to the shaft 34 which is turned with a chain drive 84 of conventional construction.

In the pressure spring 86, the rotor is held steady by means of a washer and bolt on the end of the shaft 34. This also provides for holding plates 66, 70 rigidly together and allowing no vacuum or air to leak therethrough, as described above, and still be free enough to allow the nylon plate 66 to slide freely against the steel plate 70 with a small amount of friction only.

Figure 2:
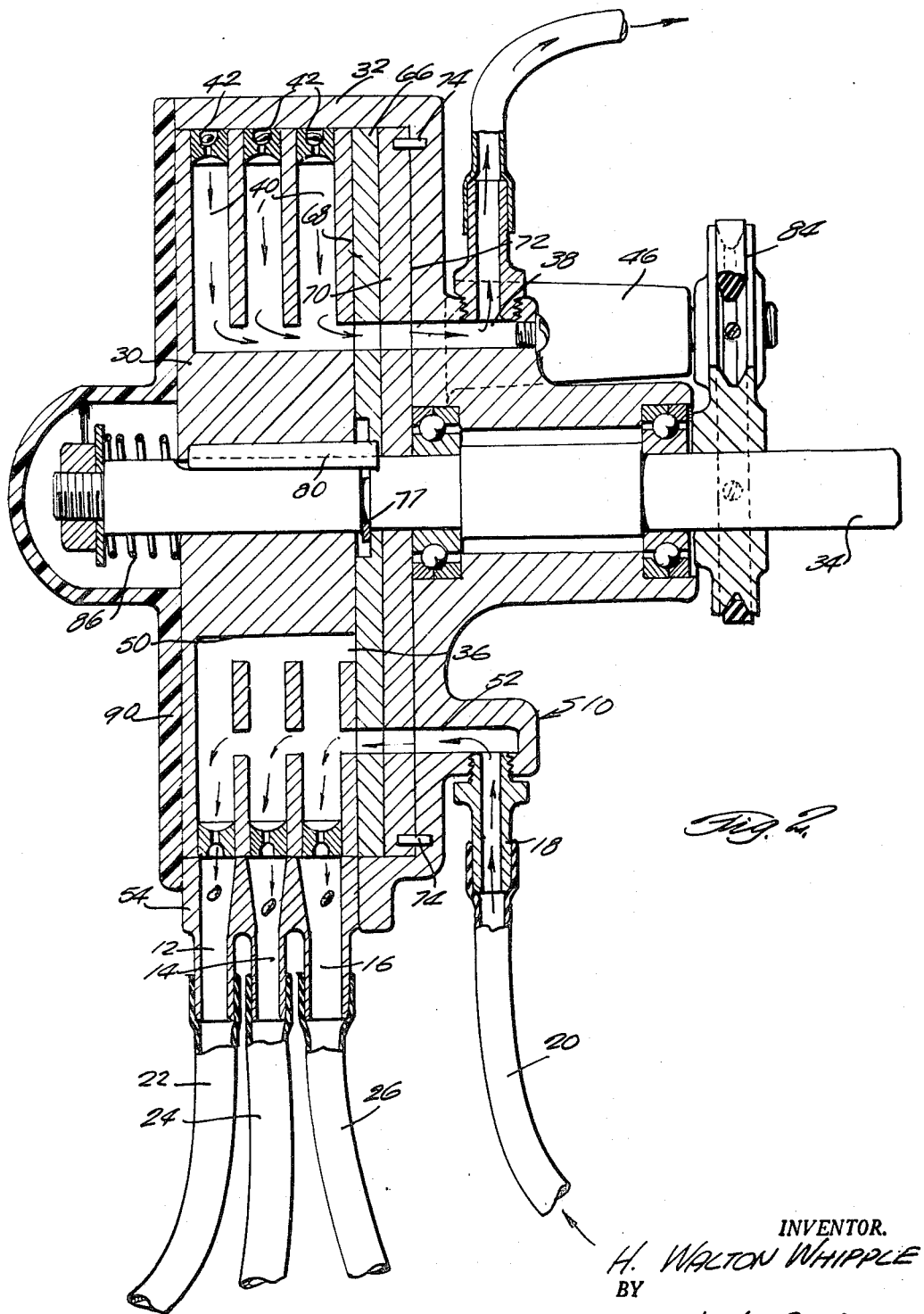
FIGURE 2 is a cross-sectional view taken from a side view of FIGURE 1 thereof.

Also observed in FIGURE 2 is a clear plastic cover plate 90 which provides an observer to have clear vision of the internal operation of the seed planter 10. An electric vacuum switch 92 fits over the seed tips in housing 32, as shown, and as seed tips pass this point, and fail to have a seed in the tip 42, then the vacuum will pull on the switch diaphragm 94 for closing the switch points 96 and for energizing the flashing of a light 98 mounted on the tractor panel (not shown) to warn the operation of the difficulty and condition that seeds are not being fed through the tip 42.

In the chain drive 84, there is seen to be provided two small pulley wheels that turn the brush 46 of FIGURE 1.

Additional embodiments of the invention in this specification will occur to others and therefore it is intended that the scope of the invention be limited only by the appended claim and not by the embodiment described hereinabove. Accordingly, reference should be made to the following claims in determining the full scope of the invention.

What is claimed is:

1. A selective seed planter comprising a seeder housing having a rotor wheel mounted therein and with close tolerance thereto, said rotor wheel having a shaft for turning said wheel, said rotor wheel having a plurality of radially disposed slots extending from the periphery of the rotor wheel to an intermediate point spaced from the shaft, said radial slots adapted to engage with a chamber connected to a vacuum line for drawing seeds into said slots when said slots pass through a seed bin under force of said vacuum, said wheel then turning through its upward position and thence around to a discharge point at the bottom of said housing for discharging said seeds into a chamber connected by a tubing to the area sought to be seeded, and in which the seeds are blown under pressure by having said slots now engage with a chamber connected to an air compressor, seed selector tips being engaged at the openings of said slots adjacent the peripheries of said rotor wheel, said shaft being driven by a belt arrangement, and a rotatable brush being mounted for sweeping the periphery of said rotor wheel to reduce the number of seeds that are engaged in the opening apertures of said slots, said brush being rotatably driven by the belt drive of said shaft.

References Cited

UNITED STATES PATENTS

| | | | |
|---|---|---|---|
| 1,637,834 | 8/1927 | Oliver | 221—211 |
| 2,415,577 | 2/1947 | Bushue | 221—211 X |
| 2,732,925 | 1/1956 | Balzer | 111—77 X |
| 2,980,043 | 4/1961 | Beck | 111—77 |
| 2,986,305 | 5/1961 | Koerper et al. | 221—211 |
| 3,100,462 | 8/1963 | Steele et al. | 221—211 X |

FOREIGN PATENTS

| | | |
|---|---|---|
| 58,461 | 4/1913 | Austria. |

SAMUEL F. COLEMAN, *Primary Examiner.*